(12) United States Patent
Lu

(10) Patent No.: US 6,285,758 B1
(45) Date of Patent: Sep. 4, 2001

(54) MOBILE PHONE HOLDER

(75) Inventor: Shu-Shen Lu, Hsin-Tien (TW)

(73) Assignee: Citech Co., Ltd. (TW)

( * ) Notice: Subject to any disclaimer, the term of this patent is extended or adjusted under 35 U.S.C. 154(b) by 0 days.

(21) Appl. No.: 09/399,833

(22) Filed: Sep. 21, 1999

(51) Int. Cl.[7] ..................................... H04M 1/00
(52) U.S. Cl. ........................... 379/446; 379/455
(58) Field of Search ................. 379/446, 455, 379/454, 426

(56) References Cited

U.S. PATENT DOCUMENTS

| | | | |
|---|---|---|---|
| 5,555,302 | * | 9/1996 | Wang ................................. 379/446 |
| 5,694,468 | * | 12/1997 | Hsu ................................... 379/446 |
| 5,788,202 | * | 8/1998 | Richter .............................. 379/446 |

* cited by examiner

*Primary Examiner*—Jack Chiang
(74) *Attorney, Agent, or Firm*—Ostrolenk, Faber, Gerb & Soffen, LLP

(57) ABSTRACT

A mobile phone holder is disclosed. The mobile phone has a disk operatively controlling a first plate and a second plate to move simultaneously to each other or away from each other. With such an arrangement, the mobile phone holder is able to adjust its size to receive all kinds of different mobile phones readily by simply rotating the disk.

5 Claims, 5 Drawing Sheets

MOBILE PHONE HOLDER

BACKGROUND OF THE INVENTION

1. Field of the Invention

The present invention relates to a mobile phone holder, and more particularly to a mobile phone holder that is able to adjust its size readily so as to receive all kinds of mobile phones.

2. Description of Related Art

Due to the booming of modem technology of telecommunication, mobile phones have become a daily necessity for the users. In order to grasp the trend, all the telecommunication manufacturers focus on making various kinds of mobiles. Each of the mobile phones have its own unique appearance design and function for the customers to choose according to various requirements. Besides all the different-sized mobile phones, other mobile phone accessories are also introduced to meet with the customer's requirements. Among them, a mobile pone holder has become the top seller in the market. That is because various customers have various needs for the mobile phones, which circumstantially promotes the popularity of mobile phone holder. However, once the customer decides to change the brand of the mobile phone, due to the size change of the mobile phone, the customer will have to purchase another holder to receive the new mobile phone, which is quite a waste to the customer. To overcome the shortcoming, a new holder for receiving a mobile phone therein is thus introduced to the market. Yet, this kind of mobile phone holder mostly uses springs with strong strength, which not only is inconvenient to the user, but also is easy to damage the housing of the mobile phone. Again, due to the strength of the spring, the manufacturer also encounters difficulty of assembling the holder and high cost.

Therefore, it is an objective of the invention to provide an improved mobile phone holder to mitigate and obviate the aforementioned problems.

SUMMARY OF THE INVENTION

The primary objective of the invention is to provide an improved mobile phone holder to receive all kinds of mobile phones readily.

Another objective of the invention is to provide an improved mobile phone holder having a disk provided with a helical groove, such that two positioning bosses provided on a first plate and a second plate are able to be received in the helical groove to enable the first plate and the second plate to move inward or outward simultaneously when rotating the disk.

Still, another objective of the invention is to provide grill-like structure on the first plate and the second plate, such that when the first and the second plates are assembled, the grill-like structure will be able to ensure that no relative movement between the first and the second plates in the vertical direction.

Other objects, advantages and novel features of the invention will become more apparent from the following detailed description when taken in conjunction with the accompanying drawings.

DETAILED DESCRIPTION OF PREFERRED EMBODIMENT

Figure 1:
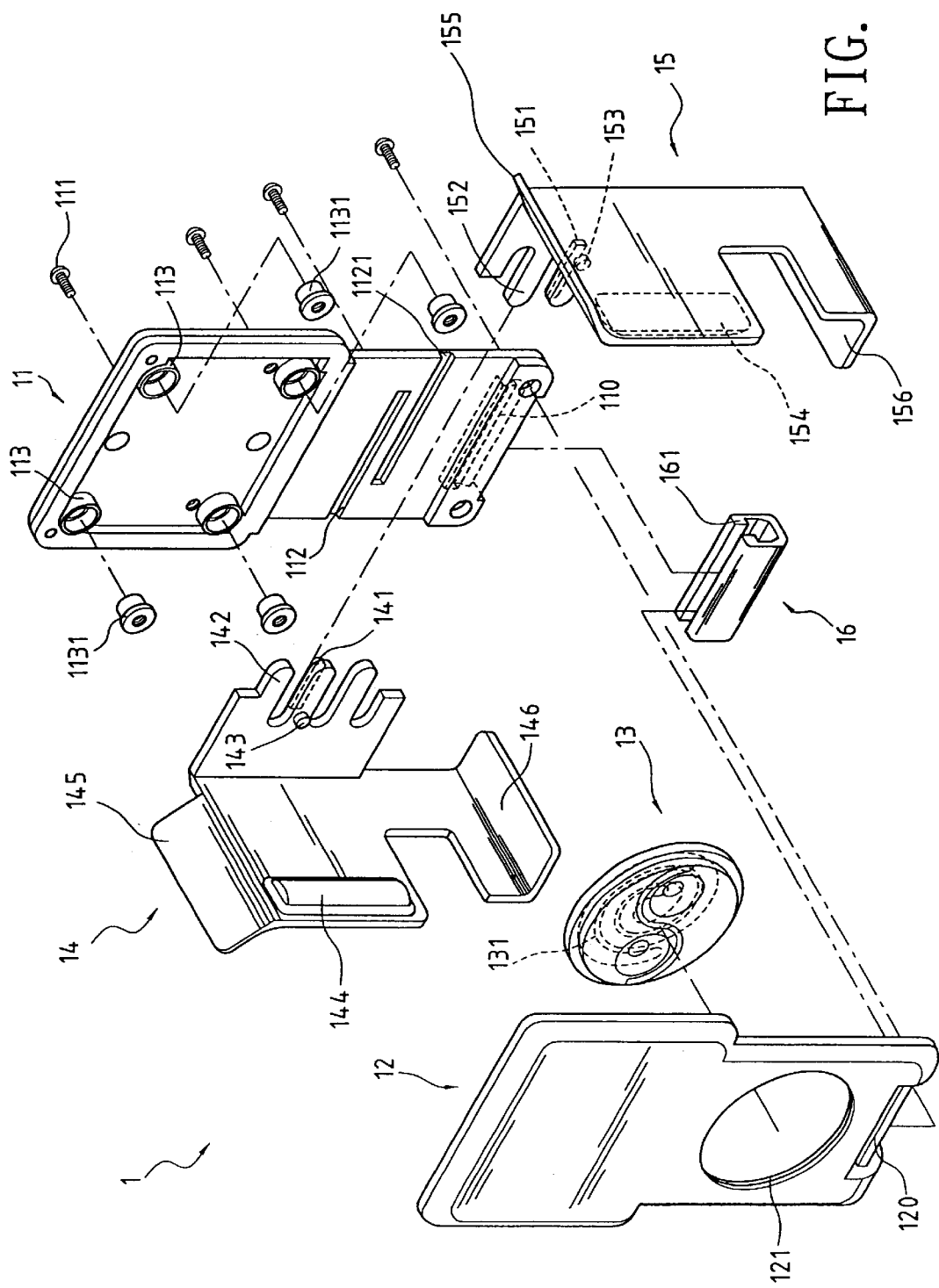
FIG. 1 is an exploded perspective view of a mobile phone holder in accordance with the invention.
Figure 2:
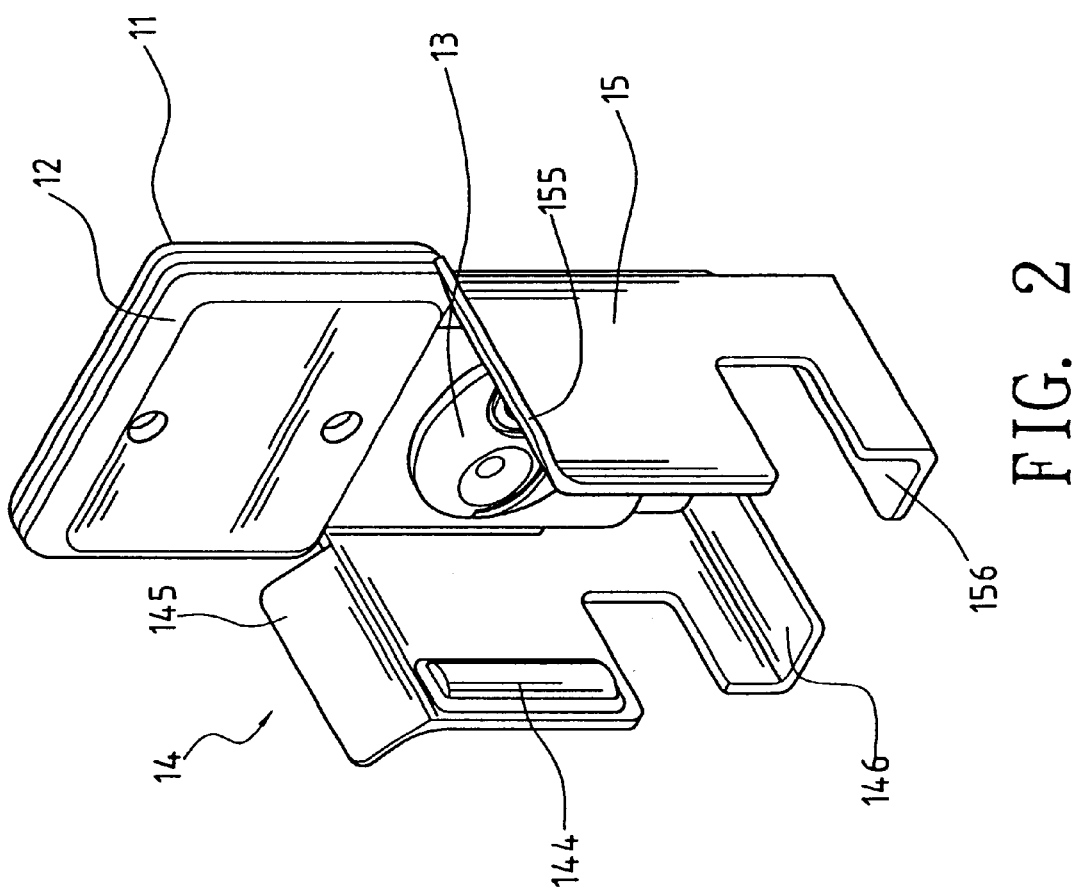
FIG. 2 is a perspective view showing the assembled mobile phone holder in accordance with the invention.

With reference to FIGS. 1 and 2, a mobile phone holder (1) constructed in accordance with the present invention is shown. The mobile phone holder (1) has a substantially rectangular base plate (11), a substantially rectangular front plate (12) detachably connected with the base plate (11), a first plate (14) and a second plate (15) slidably mounted between the base plate (11) and the front plate (12). The base plate (11) has a first recess (110) defined in a bottom thereof and the front plate (12) has a second recess (120) defined to correspond to the first recess (11), such that a U-shaped clamp (16) provided with two hooks (161) on each of the free ends thereof is able to secure the bottoms of the base plate (11) and the front plate (12) by inserting the hooks (161) into the first and the second recesses (110,120). As for the engagement between the top of the base plate (11) and the front plate (12), a user is able to use a screw (111) to accomplish the goal. The base plate (11) has a first track (112) and a second track (1121) defined in a mediate portion thereof. Furthermore, the base plate (11) has a plurality of circular flanges (113) formed on the top portion thereof so as to respectively receive a nut (1131) therein. With the co-operation between the circular flange (113) and the nut (1131), the user is able to attach necessary accessories, i.e., a belt, on the base plate (11).

The front plate (12) has a through hole (121) defined to receive a disk (13). The disk (13) protrudes partly from the through hole (121) and has a helical groove (131) defined in a face thereof. The disk (13) is then partly received in a space defined between the base plate (11) and the front plate (12). The first plate (14) and the second plate (15) are made symmetrically alike. The first plate (14) has a first bar (141) formed on a back face thereof to correspond to the first track (112) of the base plate (11), a plurality of first fingers (142) integrally extended out therefrom, a first boss (143) formed on a front face thereof to correspond to the helical groove (131) and a first stop (144). The second plate (15) has a second bar (151) formed on a back face thereof to correspond to the second track (1121) of the base plate (11), a plurality of fingers (152) integrally extended out therefrom to alternatively correspond to the first fingers (142), a second boss (153) formed on a front face thereof to correspond to the helical groove (131) of the disk (13) and a second stop (154).

In assembly, the first bar (141) is inserted into the first track (112) and the second bar (151) is inserted into the second track(1121). Meanwhile, the first boss (143) and the second boss (153) are respectively inserted into the helical groove (131). Thereafter, the front plate (12) and the base plate (11) are assembled by means of the clamp (16), before the disk (13) is partly received in the through hole (121).

With reference to FIG. 2, it is to be noted that after the assembly of all the parts, the mobile phone holder (1) of the invention is shown. The first plate (14) and the second plate (15) each further have an inclined upper portion (145,155) and a bottom (146,156) integrally formed on the top portion and the bottom portion thereof respectively, such that a mobile phone is able to be smoothly slid between the first and the second plate (14,15) and supported by the bottoms (146,156).

Figure 3:
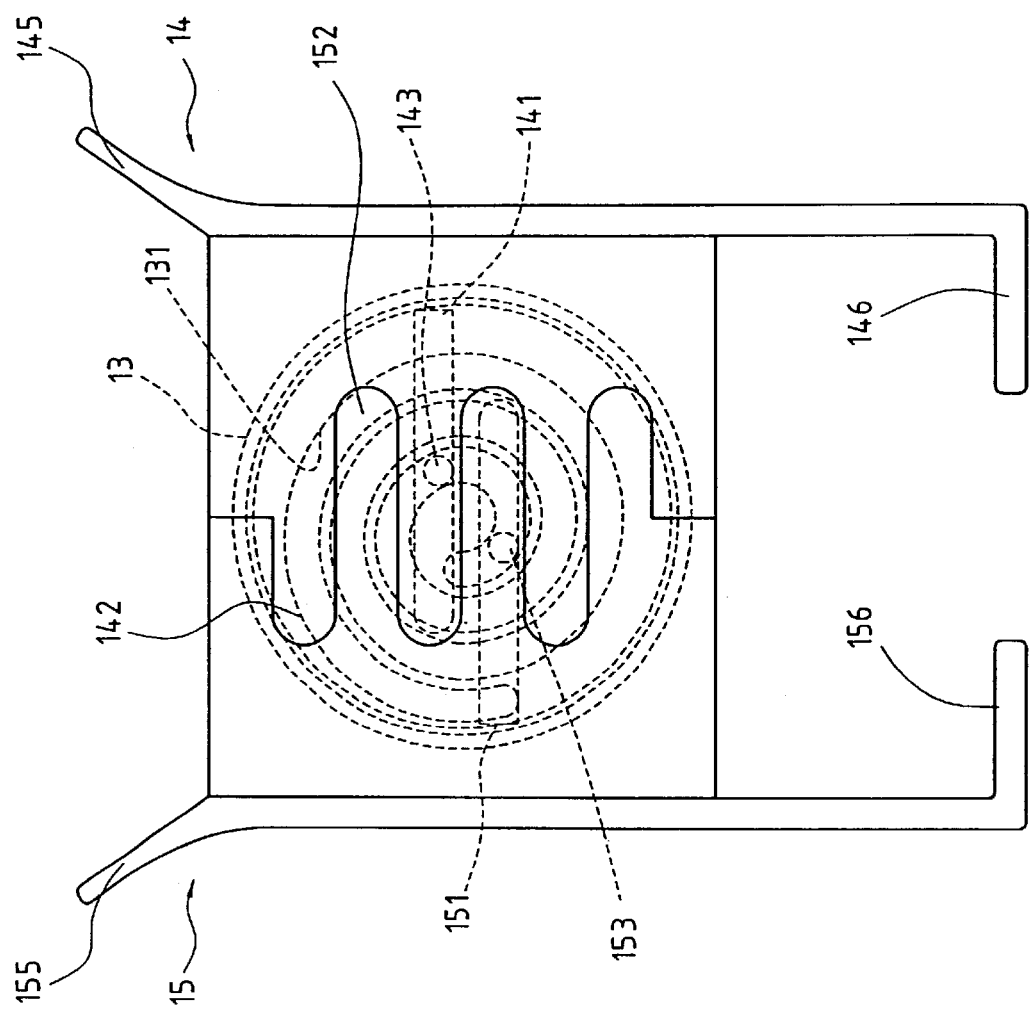
FIG. 3 is a schematic view showing that a first plate and a second plate will move to each other by rotating a disk.
Figure 4:
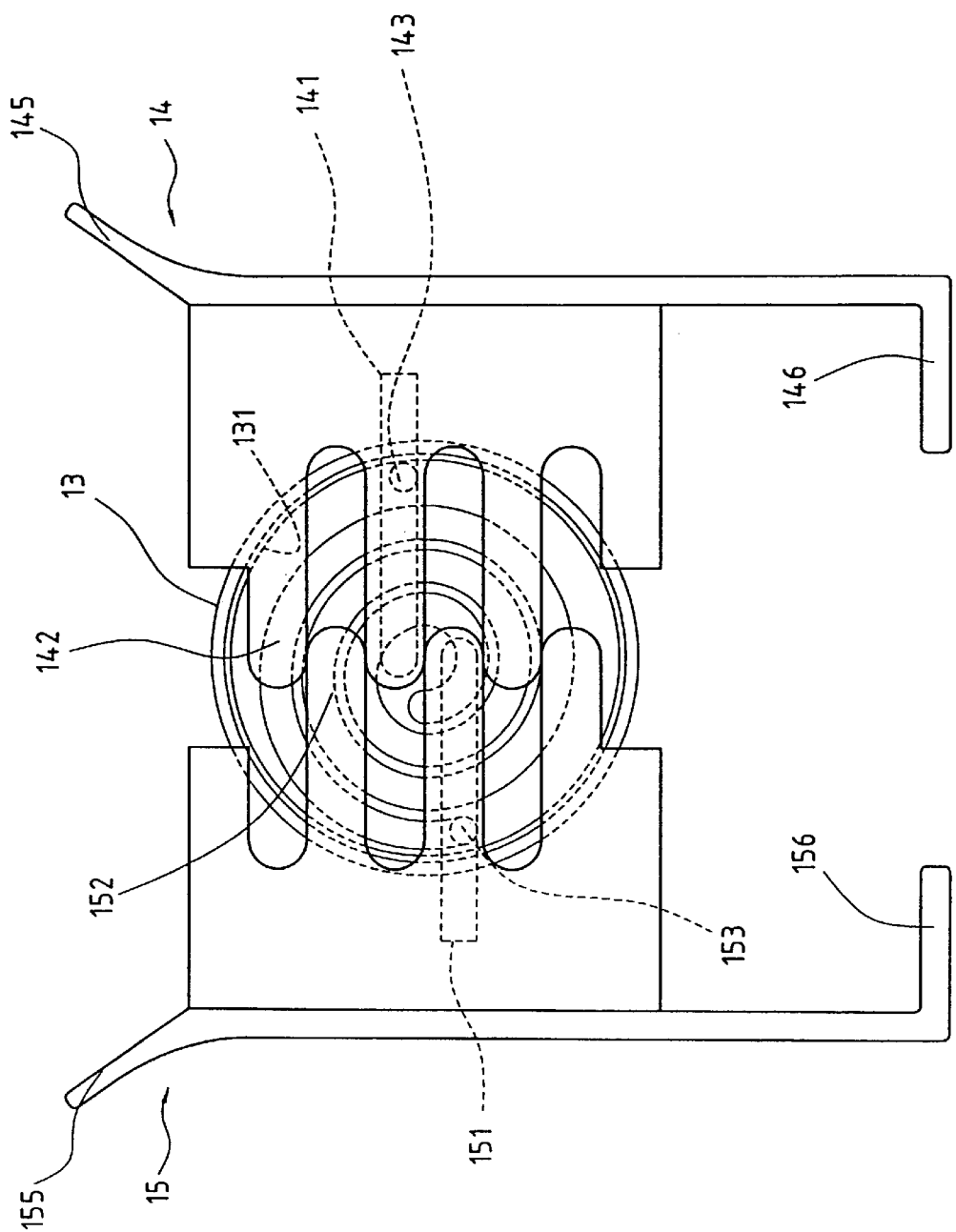
FIG. 4 is a schematic view showing that the first plate and the second plate will move away from each other by rotating the disk in a direction opposite to that of FIG. 3.
Figure 5:
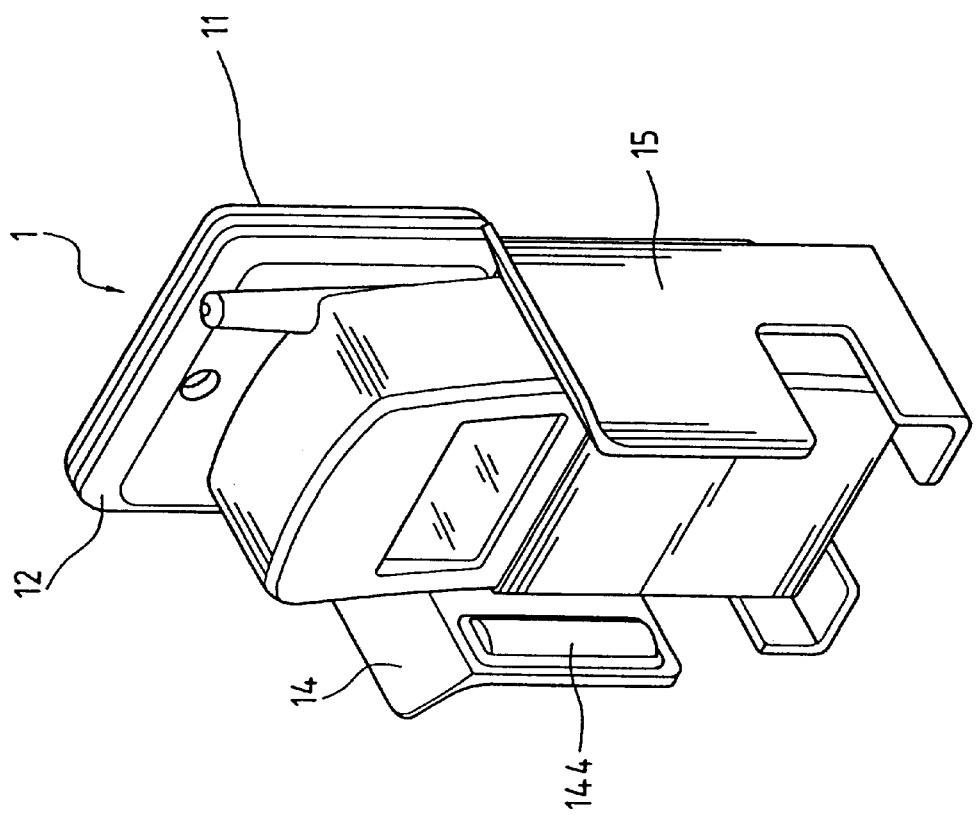
FIG. 5 is a perspective view showing that the mobile phone holder of the invention has a mobile phone received therein.

With reference to FIGS. 3, 4 and 5, it is to be noted that when the user tries to adjust the gap between the first plate (14) and the second plate (15), the user is able to rotate the disk (13) clockwise or counterclockwise. With the counterclockwise rotation of the disk (13), the first boss (143) and the second boss (153) will be driven to move to each other due to the limitation of the helical groove (131). However, with the clockwise rotation of the disk (13), the first boss (143) and the second boss (153) will be driven to move away from each other due to the limitation of the helical groove (131).

It is therefore noted that when the user changes the brand of the mobile phone, as well as the size thereof, the user can simply rotate the disk (13) to adjust the gap between the first plate (14) and the second plate (15) so as to enable to receive a mobile phone of different size.

When the mobile phone is received between the first plate (14) and the second plate (15) and supported by the bottoms (146,156), the first stop (144) and the second stop (154) are able to prevent the mobile phone from slipping out therefrom.

In conclusion, the mobile phone holder (1) of the present invention has the following advantages:

1. one size fits all;
2. easy assembly;
3. reduced cost; and
4. easy operation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile phone holder comprising:
   a base plate (11) having a first recess (110) defined in a bottom thereof, a first track (112) and a second track (1121) defined in a mediate portion thereof;
   a front plate (12) detachably connected with the base plate (11) and having a second recess (120) defined to correspond to the first recess (11) and a through hole (121) defined through a periphery thereof;
   a disk (13) partly and rotatably received in the through hole (121) of the front plate (12) and defining in a periphery thereof a helical groove (131);
   a U-shaped clamp (16) having two hooks (161) formed to be received in the first recess (11) and the second recess (120) respectively so as to clamp the base plate (11) and the front plate (12) together; a first plate (14) slidably movable with respect to
   the base plate (11) and having a first bar (141) formed on a back face thereof to correspond to and received in the first track (112) of the base plate (11), a first boss (143) formed on a front face thereof to correspond to the helical groove (131) and a first stop (144);
   a second plate (15) slidably movable with respect to the base plate (11) and having a second bar (151) formed on a back face thereof to correspond to and received in the second track (1121) of the base plate (11), a plurality of fingers (152) integrally extended out therefrom to alternatively correspond to the first fingers (142), a second boss (153) formed on a front face thereof to correspond to the helical groove (131) of the disk (13) and a second stop (154).

2. The mobile phone holder as claimed in claim 1, wherein the base plate further has a plurality of circular flanges (113) formed on the top portion thereof so as to respectively receive a nut (131) therein;
   whereby with the co-operation between the circular flange (113) and the nut (1131), a necessary accessories, i.e., a belt, is able to be attached to the base plate (11).

3. The mobile phone holder as claimed in claim 2, wherein the first plate (14) and the second plate (15) are made symmetrically alike.

4. The mobile phone holder as claimed in claim 1, wherein the first plate (14) further has, a plurality of first fingers (142) integrally extended out therefrom and the second plate (15) has a plurality of second fingers (152) formed to alternatively correspond to the first fingers (142), whereby no relative vertical movement exists between the first plate (14) and the second plate (15).

5. The mobile phone holder as claimed in claim 4, wherein the first plate (14) has a first inclined plate (145) and a bottom (146) and the second plate (15) has a second inclined plate (155) and a bottom (156), such that after the first plate (14) and the second plate (15) are assembled, the first and the second inclined plates (145,155) are able to provide for the mobile phone to be smoothly slid into the mobile phone holder; and the bottoms (146,156) are able to support the mobile phone when the mobile phone is received in the mobile phone holder.

* * * * *